Oct. 25, 1949.  L. MACKTA  2,485,618
DISTANCE AND DIRECTION FINDER RADIO BEACON SYSTEM
Filed Nov. 8, 1944
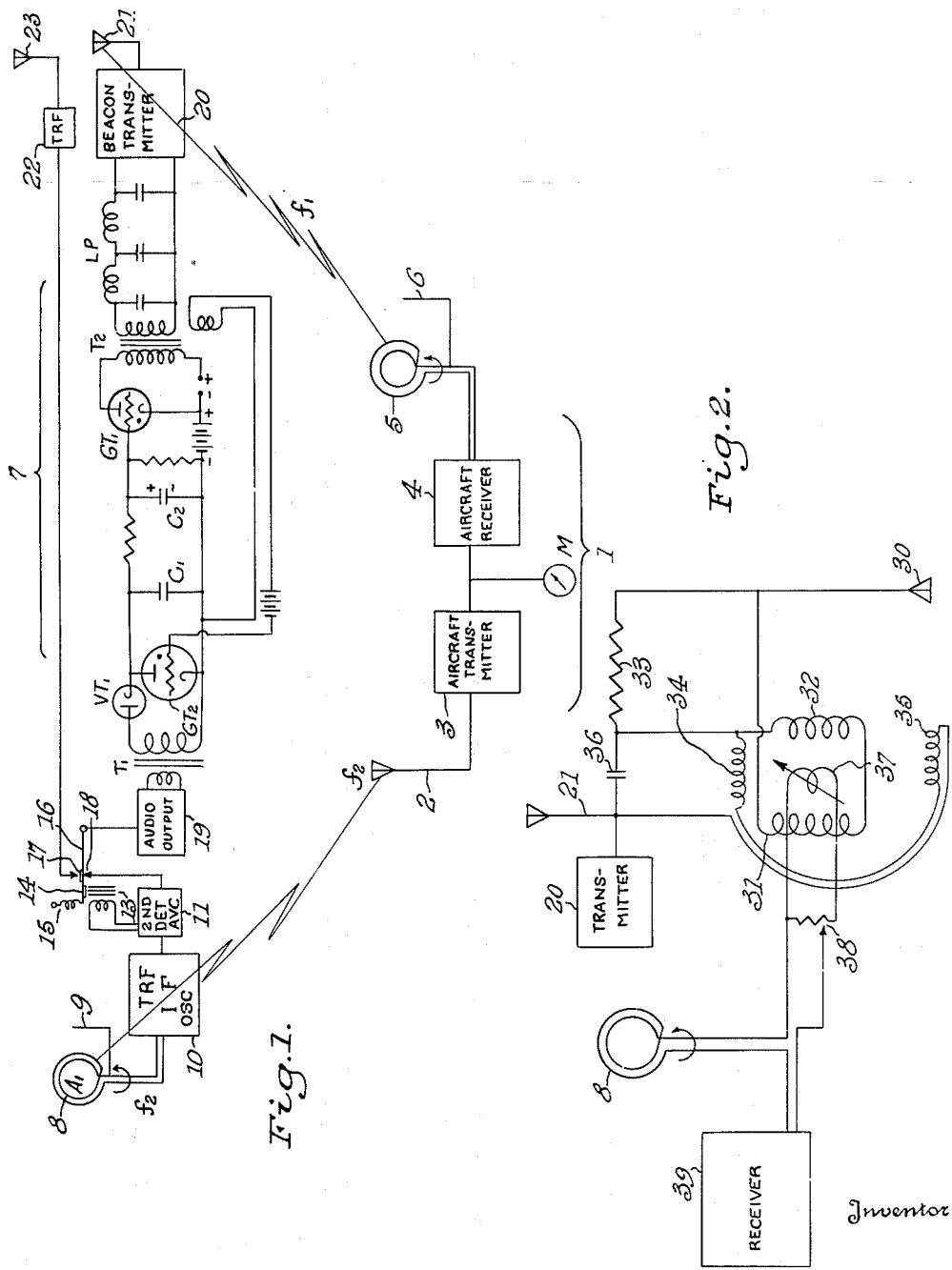
Inventor
Leo Mackta
By Harry M. Saragovitz
ATTORNEY Patented Oct. 25, 1949

2,485,618

UNITED STATES PATENT OFFICE 2,485,618

DISTANCE AND DIRECTION FINDER
RADIO BEACON SYSTEM

Leo Mackta, New York, N. Y.

Application November 8, 1944, Serial No. 562,537

3 Claims. (Cl. 343—5)

(Granted under the act of March 3, 1883, as
amended April 30, 1928; 370 O. G. 757)

The invention described herein may be manufactured and used by or for the Government for governmental purposes, without the payment to me of any royalty thereon.

It is an object of this invention to provide means for measuring the distance between one point and another by transmitting a radio wave from one point to the other and back again, and noting the time of transit in each direction of the radio signal over the distance to be measured.

More specifically, my device comprises two stations, each composed of a receiver and a transmitter. One station is provided with a transmitter which only emits a pulse upon the receipt of a signal from the other station. At the other station there is provided a frequency meter which determines the frequency of repetition of an amplitude pulse, which is generated and re-generated periodically by a returned signal. It will be readily apparent that the station at which the meter is located may be carried by an aircraft, ship or other movable vehicle so that the meter will give an indication of the distance of the vehicle from the other station.

A further object of my invention is to provide a beacon station which is useful for distance indications as set forth above, and which also gives direction signals in the ordinary manner when it is not called upon to give distance signals. This is made possible when one station is provided with a blocking relay which only connects the transmitter, controlled thereby to its receiver when a signal is received by said receiver.

Further objects of my invention will be obvious to those skilled in the art or apparent as the description of this invention, together with the illustration of this invention in the drawings, proceeds. At the end of this specification I will distinctly point out the novel features which I desire to hold by Letters Patent.

Fig. 1 of the drawings is a schematic electric circuit diagram with some parts or circuits indicated in block form.

Fig. 2 is a schematic block diagram of a portion of a circuit comprising a modification.

Proceeding with the description of a preferred embodiment of this invention selected from the many obvious variations which this invention may take, there is generally indicated at 1 a station conveniently called the aircraft station. This comprises a transmitting antenna 2 connected to an aircraft transmitter 3 which is in turn fed from an aircraft receiver 4 and receives its signal by means of an antenna comprising a loop 5 and a vertical rod 6, this being an ordinary type of direction finding antenna. Between transmitter 3 and receiver 4 is connected a frequency meter M which may be of the cathode ray tube discriminator type.

At 7 there is generally indicated the other station called for convenience the beacon or ground station. This station comprises a receiving antenna made up of a loop 8 and a vertical rod 9 which may be a loop and sense antenna or any more directional type. The receiving antenna 8—9 feeds a tuned radio frequency and intermediate frequency oscillator section 10 from which the signal is led to a second detector and automatic volume control section 11. Connected to the output of section 11 is a relay S comprising a coil 12, a core 13, an armature 14, a spring 15, and a movable contact 16 cooperating with stationary contacts 17 and 18. Contact 16 connects to an audio section 19 which in turn feeds the primary of transformer T1, which is provided with a high impedance secondary connected to a diode VT1. Connected in series across the secondary of T1 and the diode VT1 is a thyratron GT2. Also connected in parallel across GT2 are condensers C1 and C2 with a resistor R1 between them. This circuit terminates in the cathode-to-grid circuit of a second thyratron GT1 whose plate circuit contains a primary of a transformer T2 whose secondary is connected to a low-band pass filter LP which is connected to a beacon transmitter 20 having a transmitting antenna 21. These thyratrons may conveniently be type 884.

Stationary relay contact 17 is connected to a single tube tuned radio frequency detector section 22 which is coupled to a receiving antenna 23.

The operation of my device is as follows:

The beacon transmitter 20 and its antenna 21 operate at one frequency channel designated $f_1$ while the aircraft transmitter 3 and its antenna operate at another frequency channel designated $f_2$. These channels are each 5 kc. wide. Each audio system involved must have flat characteristics over a range from 100 C. P. S. to 5,000 C. P. S. so that a definite phase velocity may be obtained for the pulse wave form (which is approximately sinusoidal) in the electric circuits. The aircraft transmitter 3 by means of its antenna 2 emits a constant wave (CW) signal at frequency $f_2$. This is received by antenna 8—9 of the beacon receiver 7 and passes through oscillator 10 and detector section 11 to relay S where is energizes coil 12 and attracts armature 14 opening contacts 16—17 and closing contacts 16—18 against the stress of spring 15. Therefore, relay S remains in this position only during the receipt of such a signal. In this position relay S disconnects detector 22 and its antenna 23 from the audio section 19 and connects oscillator 10 and detector section 11 to the audio output section 19. This actuates the system for distance indication. The closing of relay S initiates the first pulse in the following manner:

The output of audio section 19 is passed through the transformer $T_1$ and is rectified by diode $VT_1$. The D. C. output voltage of this tube charges condenser $C_1$ since tube $GT_2$ is normally non-conducting. $R_1$ is a charging resistance for condenser $C_2$ and its value determines the rate at which a potential builds up in condenser $C_2$. This is a time delay element which is deliberately incorporated in the beacon station and is maintained closely and accurately in that fixed and stationary installation. The purpose of this deliberate time delay is to add to the transit time of the radio signal in space to keep the repetition of the pulse below 5,000 C. P. S. as the distance betwen the aircraft and the beacon becomes small and the transit time approaches zero. If the maximum repetition frequency permitted is 5,000 C. P. S. the transit time in space resulting from a 5 mile separation of the aircraft and the beacon is approximately 25% of the total period. This reduces the accuracy of the measurement but makes it significant. At greater distances the transit time becomes the more important factor. A suitable value for the time delay induced by $R_1$ is 200 microseconds.

Returning now to the detailed description of the operation, it will be seen that when $C_2$ is charged to a sufficient value thyratron $GT_1$ will discharge. The discharge of $GT_1$ causes a single pulse to be generated in the primary of transformer $T_2$. This pulse also discharges condenser $C_2$ to a low potential by means of the current flow in the grid circuit of tube $GT_1$. Another portion of the pulse from transformer $T_2$ is used to ionize thyratron $GT_2$ which discharges condenser $C_1$ to a definite low potential. The cycle is not repetitious since the ionizing voltage of tube $GT_1$ has disappeared. The output from the secondary of transformer $T_2$ passes through low-band pass filter LP which cuts off at 5,000 C. P. S. and also corrects the wave form. This output is then fed to the modulator of beacon transmitter 20 which causes antenna 21 to emit a frequency $f_1$. This frequency $f_1$ is picked up by the antenna 5—6 of the aircraft receiver 4. Receiver 4 is coupled electrically directly to the aircraft transmitter 3. The frequency meter M, which may be, as has been stated, of the cathode ray tube discriminator type, measures the repetition frequency of this pulse and serves as the distance indicator.

The following characteristics of the system will have to hold for the system to be exact: there must be accurate AVC in the receivers and the transmitters must be modulated 100% by the pulses. The ignition and deionization time of the 884 type thyratrons are sufficiently small to be of no consequence in the system. The signal delay obtained in the aircraft receiver-transmitter set is as small as possible and constant, included in the calibration of the frequency meter.

In order to make the beacon automatic in operation, requiring no call from the aircraft to obtain priority of use, an assumption is made that in any particular azimuth, in a band about 30 degrees wide, there will be only one aircraft requiring the use of the beacon at any instant. Using this assumption, the receiving antenna 8—9 of the beacon station may be of a roughly directional type, receiving a beam about 30 degrees wide, rotating at about 1 revolution per minute, scanning the horizon. A loop-sense antenna setup may be adequate, in any event this should not be difficult for a receiving antenna, especially if a moderately high frequency is used.

The above would give each aircraft about five seconds of control over the beacon, during which time it would be required to make a frequency determination, with further checks at one minute intervals. There would be no interference with the DF properties of the beacon station for other aircraft, since the constant signal tone would be emitted adirectionally, except when it is changed in pitch for five second intervals by control from an aircraft. The beacon station 7 may sign its call lettters at intervals less or greater than one minute, so that one particular direction is not interfered with at every revolution of the receiving antenna. To check whether he has control of the beacon when a tone change is received, the navigator need only flick off his transmitter carrier momentarily and determine whether a tone change takes place. If the tone is for another aircraft, there will be no effect. If there is another aircraft in the same azimuth the tone will not come back to the original high frequency (5,000 C. P. S).

When the aircraft transmitter 3 and its antenna 2 no longer emit a constant wave signal the aircraft loses control of the beacon station. This permits spring 15 to disconnect beacon receiver 10—11 frfom the audio output section 19 and connects detector 22 to audio output 19. Under these conditions the beacon 7 emits a constant tone which serves as a direction finding indicator as stated above. This is obtained by the following means:

Beacon transmitter 20 and its antenna 21 emit a signal at frequency $f_1$ which is picked up by antenna 23 rectified by detector 22 and passed through contacts 17—16 to audio section 19 where it serves to regenerate a pulse in the manner already described in connection with the distance finding operation. This causes the beacon 7 to emit a constant tone generated by direct feeding of its transmitter 20. During this operation relay S is under the control of oscillator amplifier section 10 so that upon receipt of a CW signal from an aircraft the relay S will be again operated. The constant tone thus generated when contacts 16—17 are closed may also be used to zero set the scale of the distance indicator (measurement frequency for zero distances) so that if the delay element incorporated in the beacon station 7 should change or if a level of atmospheric interference creates an initial charge of condenser $C_1$ to shorten the time delay, this may be compensated for.

Fig. 2 shows a modification in which but a single channel is used instead of the two channels employed in the modification already described. In this modification the station at each end of the system has its receiver supplied with an antenna adapted to receive a balancing signal from its own transmitter. The receiver will, therefore, be only sensitive to an outside signal. Using the stationary or beacon system as an example, the transmitter 20 and the antenna 21 have connected thereto an additional antenna 30 which feeds coils 31 and 32 connected in series across a resistor 33. Coils 34 and 35 are connected in series across a condenser 36. A coil 37 is mounted so as to be influenced by each of the coils 31, 32, 34 and 35 and is connected across a variable resistor 38 connected with the receiver 39 and the loop antenna 8 in series.

I claim:

1. A distance and direction finder radio beacon system including at least two stations each having a radio transmitter and a radio receiver connected to said transmitter to control the output of said transmitter, a relay connected under the control of one of said receivers, a third receiver tuned to the output frequency of the transmitter at the same station as said one receiver, electrical connections controlled by said relay connecting the transmitter to said one receiver or to said third receiver, said first mentioned receivers and transmitters being linked to pass signal from one of said stations to the other and to return said signal to said one station, and a frequency meter connected to the receiver at said one station for measuring time including the time of transit of said signal from said one station to the other and the return of said signal to said one station, the third receiver at said other station energizing the transmitter at said other station and to cause it to emit a continuous signal when said third receiver is connected to the transmitter at said other station.

2. In a system of the class described, two stations each including a radio receiver and a radio transmitter, each of said transmitters connected to its respective receiver for transmitting responses to signals intercepted by said receiver, a relay connected under the control of one of said receivers, a third receiver tuned to the output frequency of the transmitter at the same station as said one receiver, electrical connections controlled by said relay for connecting the transmitter to said one receiver or to said third receiver, said first-mentioned radio receiver and transmitter linked to pass a signal from one of said stations to the other and to return said signal to said one station, an indicating means connected to the receiver at said one station for indicating the distance between the two stations, the third receiver at said other station for energizing the transmitter at said other station and to cause it to emit a continuous signal when said third receiver is connected to the transmitter at said other station.

3. In a system of the class described, at least two stations, each including a radio receiver and a radio transmitter, each of said transmitters connected to its respective receiver for transmitting responses to signals intercepted by said receivers, a relay connected under the control of one of said receivers, a third receiver tuned to the output frequency of the transmitter at the same station as said one receiver, electrical connections controlled by said relay for connecting the transmitter to said one receiver or to said third receiver, a delay means in the output of said one receiver for introducing a fixed time delay in a received signal to be retransmitted, said first-mentioned radio receiver and transmitter being inter-connected to pass a signal from one of said stations to the other and to return said signal to said one station, an indicating means at said one station to measure the time of transit of said radio signal between said stations and back; the third receiver at said other station for energizing the transmitter and to cause it to emit a continuous signal when said third receiver is connected to the transmitter at said other station.

LEO MACKTA.

REFERENCES CITED

The following references are of record in the file of this patent:

UNITED STATES PATENTS

| Number | Name | Date |
|---|---|---|
| 1,945,952 | Nicolson | Feb. 6, 1934 |
| 2,134,716 | Gunn | Nov. 1, 1938 |
| 2,333,688 | Shepard | Nov. 9, 1943 |
| 2,400,309 | Kock | May 14, 1946 |
| 2,403,755 | Rankin | July 9, 1946 |
| 2,411,520 | Capen | Nov. 26, 1946 |
| 2,414,469 | Isbister | Jan. 21, 1947 |
| 2,428,799 | Hayes | Oct. 4, 1947 |